United States Patent [19]

Hama

[11] Patent Number: 4,780,773
[45] Date of Patent: Oct. 25, 1988

[54] MOTOR CONTROL CIRCUIT WITH CURRENT LIMITER AND BYPASS SWITCH

[75] Inventor: Keizō Hama, Kamakura, Japan

[73] Assignee: Mitsubishi Denki Kabushiki Kaisha, Japan

[21] Appl. No.: 37,147

[22] Filed: Apr. 10, 1987

[30] Foreign Application Priority Data

Apr. 15, 1986 [JP] Japan ................................ 61-86350
May 20, 1986 [JP] Japan ................................ 61-115508

[51] Int. Cl.$^4$ ...................... G11B 15/46; G11B 19/28
[52] U.S. Cl. ............................. 360/73; 318/254; 318/433
[58] Field of Search ................. 360/73, 70; 369/50; 318/254, 433

[56] References Cited

U.S. PATENT DOCUMENTS 4,611,252  9/1986  Igata et al. ........................... 360/70
4,706,005  11/1987  Iwako ............................. 360/73 X Primary Examiner—John H. Wolff
Attorney, Agent, or Firm—Leydig, Voit & Mayer

[57] ABSTRACT

A spindle motor driving apparatus for a disc device in which in addition to a controller for operating a spindle motor at a predetermined speed, a switch for shorting a current limiting resistor provided between a motor power supply circuit and a driving circuit is closed in response to a predetermined condition after the motor is started.

3 Claims, 5 Drawing Sheets

MOTOR CONTROL CIRCUIT WITH CURRENT LIMITER AND BYPASS SWITCH

BACKGROUND OF THE INVENTION

The present invention relates to a spindle motor driving apparatus for a disc device, and more particularly, to improvements in the starting rising characteristics of a spindle motor.

FIG. 1 shows a block diagram of a prior-art driver for driving a motor of a disc device. In FIG. 1, numeral 1 designates a spindle motor (hereinbelow, termed "motor"), which drives one or a plurality of magnetic discs, not shown, numeral 2 designates a spindle motor driving circuit (hereinbelow termed, "a driving circuit"), which drives the motor 1 and includes a pair of upper and lower transistors $Q_1$ and $Q_2$ to drive one phase of the motor 1 and a a motor current detecting resistor R which is used to control current for turning the motor. Numeral 3 designates a rotary angle position sensor necessary to decide the direction of driving current to the motor 1 and to detect a driving current flowing zone and motor turning speed. The rotary angle position sensor may for example, employ a Hall element. The output of the sensor 3 is input to a turning speed comparator 4, which compares the output of the sensor 3 with the output of a target turning speed generator 5 to control the turning speed of the motor 1 constantly. Numeral 6 designates a current limiter for protecting the transistors of the driving circuit 2, and numeral 7 designates a d.c. power supply, which supplies current to drive the motor 1. The above-described prior-art is a general constant motor turning speed control circuit, and the function of the current limiter 6 will be further described.

The d.c. resistance of one-phase shunt winding of the motor 1 having, for example, approx. ⅛ horsepower is approx. 0.6 ohm. Therefore, if the current limiter 6 is not provided, the current flowing to the motor 1 at the starting time becomes a value which is calculated by dividing the output voltage of the power supply 7 by the d.c. resistance and the current detecting resistor R (valued at approximately 0.1 ohm), and becomes, for example, as below.

$$\frac{\text{d.c. output voltage}}{\text{winding resistance} + \text{current detecting resistance}} = \frac{36\ (V)}{0.6 + 0.1} = 50\ (A)$$

The current flowing to the motor 1 is, on the other hand, approx. 3.4 A when the motor 1 is rotated under control of the steady-state turning speed such as, for example, 3,600 r.p.m., and the inflowing current ratio of the current at the starting time to the current at the steady-state time is large. This means tht the driving circuit 2 is largely loaded, and the cost of the transistors $Q_1$ and $Q_2$ of the final stage of the driving circuit 2 is thus raised. To this end, the current limiter 6 has been used.

Since the prior-art spindle motor driver for the magnetic disc device is constructed as described above, the driving circuit 2 is improved by the operation of the current limiter 6, but since the limiter 6 is inserted in series between the d.c. power supply 7 and the load, i.e., between the driving circuit 2 and the motor 1, a disadvantage is that the electric power is always lost to disturb the high efficiency of driving the motor with the same power supply capacity.

BRIEF DESCRIPTION OF THE DRAWINGS

In the drawings, the same symbols indicate the same or corresponding parts.

SUMMARY OF THE INVENTION

The present invention has the objective of overcoming the disadvantage of the prior art as mentioned above, and has for its main object to provide a spindle motor driving apparatus for a magnetic disc device in which the load imposed on a power supply by the motor driving apparatus is reduced, the efficiency of a driving apparatus is enhanced and the starting characteristics of the motor is further improved.

The spindle motor driving apparatus for the magnetic disc device according to the invention includes a switching instruction unit setting the condition for closing a shorting switch provided in a current limiter inserted in series between a power supply and the driving apparatus in response to the operating state of the motor.

DESCRIPTION OF THE PREFERRED EMBODIMENTS

Figure 2:
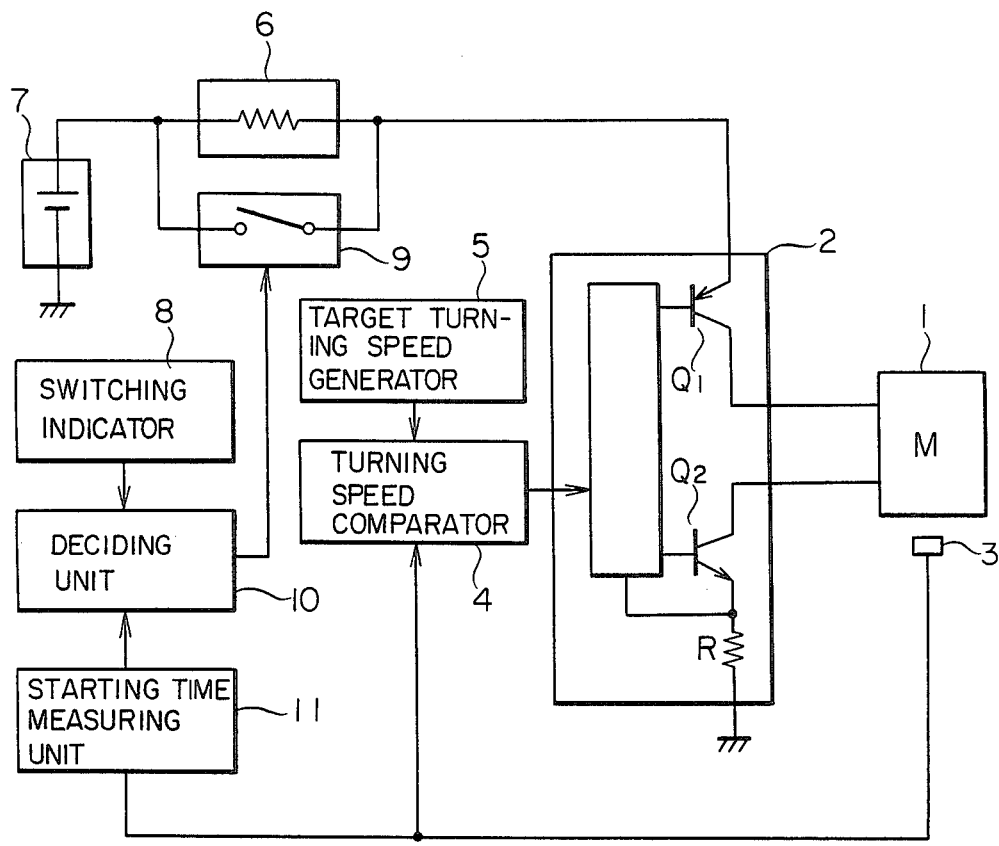
FIG. 2 is a circuit diagram showing an embodiment of a spindle motor driver for a magnetic disc device according to the present invention.

Now, an embodiment of the present invention will be described with reference to FIG. 2. In FIG. 2, numeral 8 designates a switching indicator, which outputs a signal corresponding to an optimum preset driving time for shorting a current limiter 6 by a switch 9 and applying an output voltage of the power supply 7 to a deciding unit 10 and to all loads, i.e., the driving circuit 2 and motor 1. The deciding unit 10 compares in amplitude the signal output of the indicator 8 with the signal output of a starting time measuring unit 11 for measuring the start elapsing time of the motor 1 and produces a signal output to the switch 9 to close the switch 9 when the start elapsing time becomes long or it becomes a preset driving time.

Figure 3:
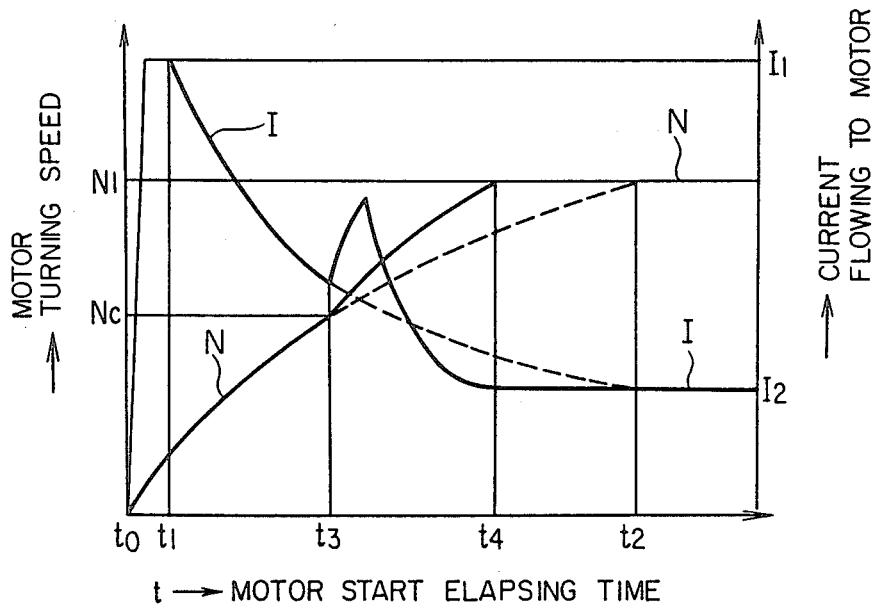
FIG. 3 is a diagram showing motor characteristics.

FIG. 3 shows the operation of this embodiment in FIG. 2. The ordinate axis indicates the turning speed N of the motor 1 and current (consumed current) I flowing to the motor 1. The abscissa axis indicates a start elapsing time t. In the drawing, broken line curves indicate an example of the operation of a prior-art driver, and solid line curves indicate an example of operation of the embodiment of the invention. The current I remains a value $I_1$ since the motor is limited to cause the current to flow in a range from time $t_0$ to $t_1$ after the motor starts, and it is thus understood that the operation of the current limiter 6 is effective. However, the current is affected by the influence of a counterelectromotive force generated by the rotation of the motor 1 in a range after the time $t_1$, i.e., the current continues to decrease in the amount corresponding to the reduction in the effective voltage applied to the motor 1, and this state continues until the current becomes a steady-state current value $I_2$ to the time $t_2$ and hence the motor arrives at the specified turning speed $N_1$.

As understood as described above, if the reduction in the counterelectromotive force of the motor 1 can be even slightly supplemented, i.e., if the effective voltage to the motor 1 can be raised, the starting characteristic of the motor 1 can be improved.

In this embodiment, the voltage drop of the current limiter 6 is used as the effective voltage rise to the motor 1.

The operation of the embodiment is exemplified with reference to the solid line curves in FIG. 3. For instance, in an actual example utilizing a motor driving system of ⅛ horsepower, 36 V of d.c. power supply voltage and 2 ohms of a current limiter resistance with a start elapsing time for slosing the switch set at $t_3 = 15$ seconds, the start arriving time to 3,600 r.p.m. of target turning speed of the motor is improved from 55 sec. ($t_2$) to 25 sec. ($t_4$).

In the embodiment described above, an example that one current limiter is controlled to be opened and closed at both ends of the limiter has been described. However, to obtain more smooth motor starting characteristic, suitable number of a plurality of current limiters inserted in series may be selected to control to open or close not all but part of the limiters.

According to the present invention as described above, the motor driving circuit is constructed to utilize the voltage drop of the current limiters inserted in series between the d.c. power supply and the load as the effective voltage of the motor in a range after the motor of the load arrives at the specified driving time. Therefore, the motor driving circuit is inexpensive to save the electric power and to improve the motor starting characteristics.

Figure 4:
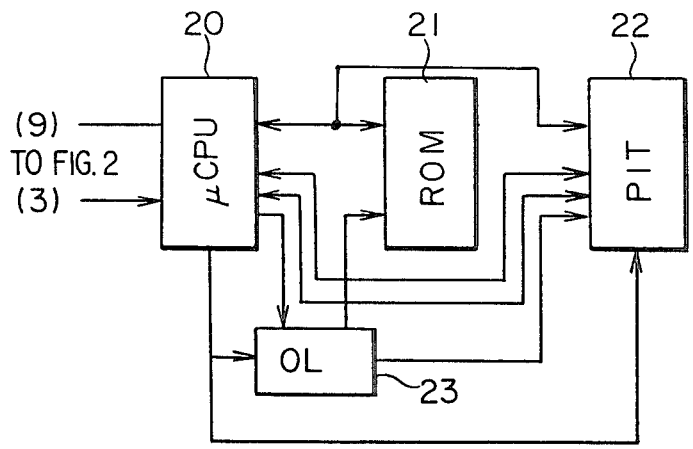
FIG. 4 is a block diagram of the spindle motor driver of the invention.

FIG. 4 shows an example applied to an actual product of the embodiment of the invention. Numeral 20 designates an 8 bit microcomputer ($\mu$CPU), which uses, for example, an M5L8039P chip made by Mitsubishi Electric Corp. Numeral 21 designates a Read Only Memory (ROM), which uses, for example, an M5L2764K chip made by Mitsubishi Electric Corp. Numeral 22 designates a Programmable Interval Timer (PIT) which uses, for example, an M5L8253P chip made by Mitsubishi Electric Corp. Numeral 23 designates an Octal Latch (OL) which is ordinarily used in a microcomputer system. This example operates as below.

When the spindle motor 1 in FIG. 2 starts rotating, the sensor 3 generates one pulse by one revolution of the motor and starts feeding a signal on the $\mu$CPU 20 in FIG. 4. The $\mu$CPU 20 detects the start of the rotation of the motor 1 by the output of the sensor 3 and then decides the closing time of the switch 9 in the following sequence.

The uCPU 20 reads the predetermined value corresponding to the closing time $t_3$ of the switch 9 from the ROM 21 and instructs to start measuring the driving lapse time of the motor 1 of the PIT 22. The uCPU 20 confirms the value of the PIT 22 for every predetermined period, compares in magnitude the value read by the PIT 22, i.e., the value corresponding to the driving lapse time t of the motor 1 with the value corresponding to $t_3$ read from the ROM 21, and instructs to close the switch 9 at the time that the relationship of $t = t_3$ is satisfied.

An octal latch 23 has the function of an address latch for latching data on a data bus.

Figure 5:
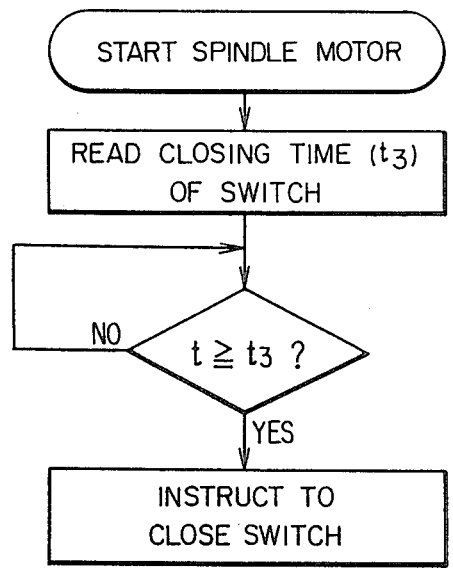
FIG. 5 is a flow chart showing the concept of the embodiment of FIG. 2.

FIG. 5 is a flow chart showing the above-described operation, showing that the closing instruction of the switch is made when the condition that a predetermined time is elapsed is satisfied after the motor is started.

Figure 1:
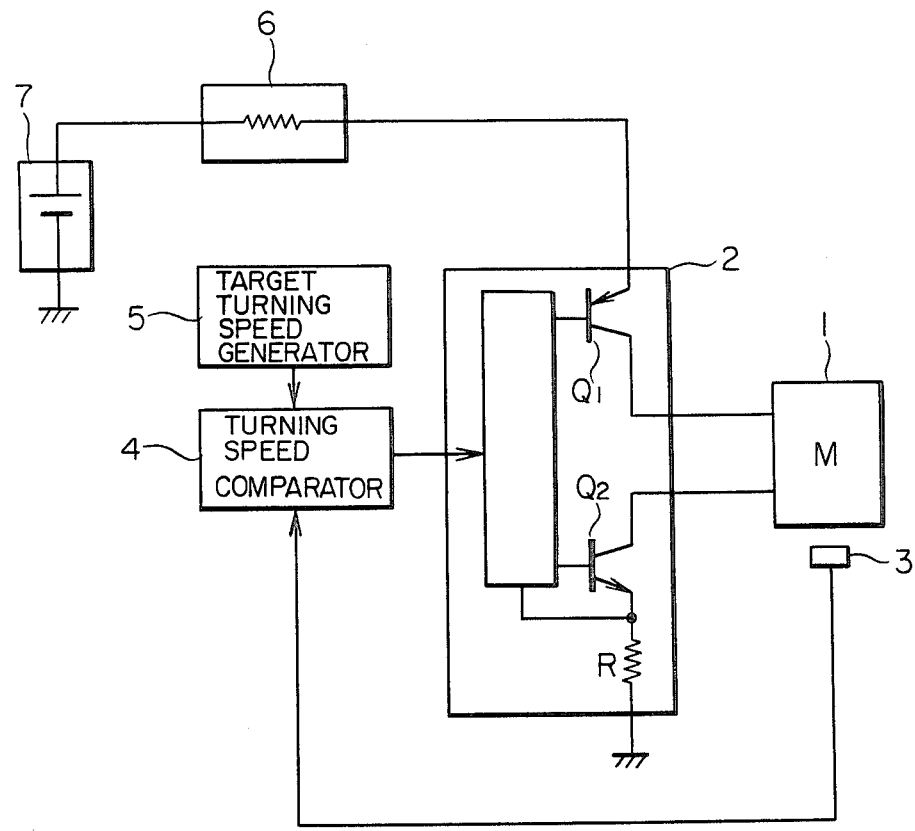
FIG. 1 is a circuit diagram of a prior-art.
Figure 6:
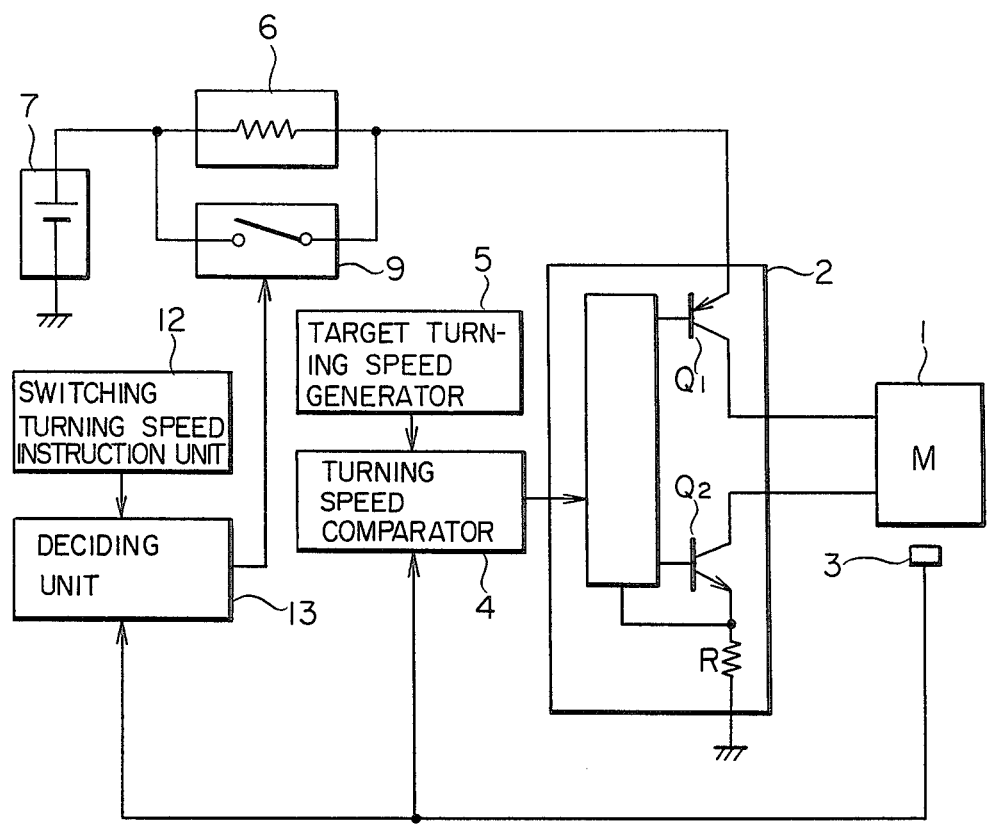
FIG. 6 is a circuit diagram showing another embodiment of a spindle motor driver for a magnetic disc device according to the invention.

FIG. 6 is a block diagram showing the construction of another embodiment of the invention, wherein the same symbols as those in FIG. 1 showing a prior-art driver indicate the same or corresponding parts. Numeral 12 designates a switching turning speed indicator, numeral 9 designates a switch, and numeral 13 designates a deciding unit. The indicator 12 is set to output a signal when the turning speed of the spindle motor 1 arrives at a predetermined value, the deciding unit 13 compares the signal output of a rotary angle position sensor 3 with the signal output of a switching turning speed indicator 12, and decides that the turning speed of the motor 1 exceeds the turning speed set to the indicator 12 to output a signal. The switch 9 is connected in parallel with a current limiter 6, and closed in response to the output signal of the deciding unit 13.

The operation of this embodiment will be described together with reference to FIG. 3. The current I flowing to the motor 1 is limited to $I_1$ by the current limiter 6 in a range from the time $t_0$ to $t_1$ immediately after the motor 1 is started, and the limiter 6 effectively operates. However, since the turning speed N of the motor 1 gradually rises after the time $t_1$ so that the counterelectromotive force of the motor increases, the current I flowing to the motor gradually decreases.

When the turning speed N of the motor 1 then arrives at the turning speed Nc set to the indicator 12, the deciding unit 13 generates a signal. Thus, the switch 9 is closed to short the current limiter 6. Since the full voltage of the d.c. power supply 7 is applied to the spindle motor driving circuit 2 at this moment, the current I flowing to the motor abruptly increases from the time $t_3$, but as the current I rises, the turning speed N of the motor also increases. Therefore, the current I flowing to the motor decreases soon. The turning speed N of the motor becomes the specified turning speed $N_1$ at the time $t_4$, and the current I flowing to the motor becomes a rated current $I_2$.

In the prior art driver, the current continuously flows to the current limiter 6, and only the voltage calculated by subtracting the voltage drop of the current limiter from the d.c. power supply voltage is applied to the motor driving circuit 2. Thus, the turning speed N of the motor 1 becomes the spedified turning speed $N_1$ at the time $t_2$ and the current I flowing to the motor becomes a rated current $I_2$ as designated by broken line curves in FIG. 3.

More specifically, assume, for example, that a d.c. power supply 7 of 36 V is prepared for the spindle motor of ⅛ horsepower and the resistance of the current limiter 6 is 2 ohms. If the switching turning speed indicator 12 is set to 2,000 r.p.m. when the rated turning speed of the motor 1 is 3,600 r.p.m., the starting time of the prior-art driver is 55 sec. of $t_2$, while that of this embodiment can be shortened to 25 sec. of $t_4$.

Since the current limiter 6 remains shortcircuited as long as the motor 1 is rotated at the turning speed higher than Nc set to the indicator 12, a disadvantage that the current limiter 6 consumes an electric power can be eliminated. Thus, in this embodiment described above, the same advantage as those in the first embodiment in FIG. 2 can be provided.

Figure 7:
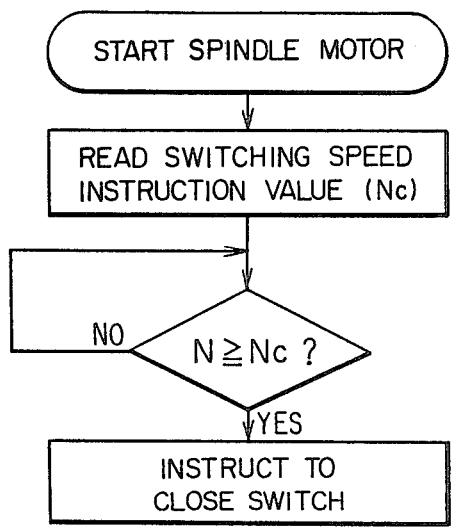
FIG. 7 is a flow chart showing the concept of the embodiment of FIG. 6.

Further, an application of the invention to an actual product may be performed by applying the embodiment of FIG. 4. In other words, when one pulse signal of the sensor 3 is generated for one revolution of the motor 1, the number of pulses is less within the set time when the motor is started and the number of generated pulses increases as the motor speed rises. Therefore, when the number of pulses is measured, the purpose can be performed. FIG. 7 is a flow chart of this case. When the turning speed of the motor arrives at a predetermined value, the switch is instructed to be closed.

What is claimed is:

1. A spindle motor driving apparatus for a disc device, said apparatus comprising:
   a spindle motor for driving a magnetic disc,
   a driving circuit electrically connected to a power supply and to said motor,
   a rotary angle position sensor outputting a signal in response to the rotation of said motor,
   a target turning speed generator setting a target turning speed of said motor and generating an output signal representative thereof,
   a turning speed comparator comparing the output signal of said sensor with the output signal of said target turning speed generator and generating a control signal to said driving circuit to operate said motor at a predetermined turning speed,
   a current limiting resistor between the power supply and said driving circuit of said motor to limit current supplied to said driving circuit,
   a shorting switch provided at said limiting resistor and operable to bypass said limiting resistor,
   a switching instruction unit setting a condition for closing said shorting switch at a predetermined time after said motor is started and generating an output signal responsive thereto, and
   a deciding unit comparing the output signal of said sensor with the output signal of said switching instruction unit and operated to close said shorting switch when the closing condition is satisfied.

2. A spindle motor driving apparatus according to claim 1 wherein said deciding unit closes said shorting switch when a predetermined time is elapsed after said motor is started.

3. A spindle motor driving apparatus according to claim 1 wherein said deciding unit closes the switch when said motor rotates at a predetermined turning speed after said motor is started.

* * * * *